United States Patent

Sakamoto et al.

Patent Number: 5,642,918
Date of Patent: Jul. 1, 1997

[54] MOVEABLE HEADREST

[75] Inventors: Manabu Sakamoto, Yokohama; Koichi Iwasaki, Ayase, both of Japan

[73] Assignee: Ikeda Bussan Co., Ltd., Ayase, Japan

[21] Appl. No.: 604,649

[22] Filed: Feb. 21, 1996

[30] Foreign Application Priority Data

Feb. 21, 1995 [JP] Japan .................................. 7-56746

[51] Int. Cl.⁶ .............................. A47C 7/36; A47C 1/10
[52] U.S. Cl. ........................................ 297/408; 297/391
[58] Field of Search ............................ 297/408, 400, 297/391, 366, 367

[56] References Cited

U.S. PATENT DOCUMENTS

| | | | |
|---|---|---|---|
| 2,828,810 | 4/1958 | Barecki et al. | 297/408 |
| 4,674,792 | 6/1987 | Tamura et al. | 297/408 |
| 4,674,797 | 6/1987 | Tateyama | 297/408 |
| 4,678,232 | 7/1987 | Ishida et al. | 297/408 |
| 4,830,434 | 5/1989 | Ishida et al. | 297/408 |
| 5,150,632 | 9/1992 | Hein | 297/366 |

FOREIGN PATENT DOCUMENTS 3-39078  8/1991  Japan .
2 176 098  12/1986  United Kingdom .

OTHER PUBLICATIONS

U.K. Search Report, GB 9603578.7, Apr. 30, 1996.

*Primary Examiner*—Peter M. Cuomo
*Assistant Examiner*—Anthony D. Barfield
*Attorney, Agent, or Firm*—Foley & Lardner

[57] ABSTRACT

A moveable headrest is equipped with a lower headrest frame shaft fixedly connected to a headrest stay detachably connected to the upper end of the seat back, and a pair of ratchet bases rotatably supported on respective shaft ends of the lower frame shaft. The ratchet bases are coupled with each other at their upper ends through a moveable upper headrest frame. A ratchet-and-pawl mechanism is attached to at least one of the base members for selectively engaging the upper frame with the lower frame shaft and for producing a forward-and-backward angular adjustment of the headrest. The shaft end of the lower frame shaft is formed with an annular stepped portion extending continuously in a peripheral direction of the lower frame shaft nearby the top end, so that the annular stepped portion abuts the inside wall surface of the ratchet base. A pawl bracket is fixedly connected to the shaft end of the lower frame shaft by all-around welding, while sandwiching the ratchet base between the stepped portion and the pawl bracket.

4 Claims, 6 Drawing Sheets

5,642,918

MOVEABLE HEADREST

BACKGROUND OF THE INVENTION

1. Field of the Invention

The present invention relates to a moveable headrest suitable for use in automotive vehicles, and specifically to a moveable headrest incorporating therein a ratchet mechanism through which the headrest is adjustable back and forth.

2. Description of the Prior Art

As is generally known, a headrest has often a manual forward-and-back adjustment, so as to be above to tilt the upper portion of the headrest back and forth. In order to change the angle of tilt of the headrest, the moveable or tiltable headrest traditionally accommodates therein a ratchet mechanism. One such moveable headrest employing a ratchet mechanism has been disclosed in Japanese Utility Model Second Publication (Jikko Heisei) No. 3-39078. FIGS. 6–10 show a structure almost similar to a moveable headrest as disclosed in the Japanese Utility Model Second Publication No. 3-39078. The structure of the conventional headrest is hereinbelow explained briefly.

Referring to FIGS. 6 to 10 and specifically to FIGS. 6 to 8, a substantially doughnut shaped conventional moveable headrest 10 having a central opening 12 includes a pair of headrest stays 13 engageable with the upper portion of the seat back, a lower headrest frame shaft 15 constructing a part of a headrest frame 11 and fixed to the headrest stays 13, and an upper moveable or tiltable headrest frame 16 mechanically linked to the lower frame shaft 15 through a ratchet-and-pawl mechanism accommodated in a base member 22 serving as a ratchet base. The doughnut shaped conventional moveable headrest 10 is often called a see-through type moveable headrest since this type of headrests can ensure a better rear view of the vehicle by virtue of its central opening. The headrest 10 also includes a pad 14 usually made of foamable or expandable synthetic resin, preferably made of foamed urethane. As illustrated by the phantom line of FIG. 6, the pad 14 is generally formed integral with the headrest frame 11 by way of injection of foam liquid into the interior of the outer skin constructing the contour of the headrest. The ratchet base 22 is rotatably supported by the lower frame shaft 15 and fixedly connected to the upper tiltable frame 16. The ratchet-and-pawl mechanism includes a toothed ratchet 24 having teeth 24a and a pawl 25 mounted on a pawl bracket 26. By means of the above-noted ratchet-and-pawl mechanism, the ratchet base 22, which is fixedly connected to the upper frame 16, is engageable with or disengageable from the lower frame shaft 15. As seen in FIG. 6, the headrest frame 11 is comprised of the lower frame shaft 15 fixed to the stays 13, the substantially reversed-U shaped upper moveable frame 16, and left and right ratchet bases 22 each constructing a ratchet-and-pawl casing 21. As appreciated from FIG. 6, each ratchet-and-pawl casing 21 is comprised of the ratchet base 22 and a ratchet cover 23 provided to hermetically cover the opening end of the ratchet base 22. As best seen in FIG. 8, the upper moveable frame 16 is traditionally fixed onto the upper inside wall surface of the respective ratchet base 22. As shown in FIG. 7, the base 22 is formed with a circular through-opening 22a through which the end 15a of the lower frame shaft 15 is rotatably fitted into the ratchet-and-pawl casing 21. As illustrated in FIG. 8, the toothed ratchet 24 is fixedly connected to the base 22, whereas the pawl bracket 26 is fixedly connected to the end 15a of the lower frame shaft 15. The pawl 25 is pivotally mounted on the pawl bracket 26 by way of its pivot shaft 28. The pivot shaft 28 is actually guided by an essentially circular arc-shaped guide groove 27 integrally formed on the inside wall of the ratchet cover 23. As seen in FIG. 7, a cam plate 29 is rotatably provided on the end 15a of the lower frame shaft 15 and disposed between the base 22 and the pawl bracket 26 to be engageable with the pawl 25. In a conventional manner, the pawl 25 is usually biased to engage with the tooth 24a of the ratchet 24 by means of a spring 30 hanged between the pawl 25 and the pawl bracket 26. When the headrest 10 has been rotated in its foremost position, as illustrated by the arrow F of FIG. 8, the lower end of the spring 30 moves across the central axis (serving as a fulcrum or a support shaft of the cam plate 29) of the end 15a of the lower frame shaft 15 and thus the bias of the spring 30 acts to disengage the pawl 25 from the tooth of the ratchet 24. Under these conditions, if the headrest 10 is returned to the backmost position as illustrated by the arrow B of FIG. 8, the pawl 25 is brought into engagement with the cam plate 29 and as a result the pawl 25 is also brought into engagement with the tooth 24a of the ratchet 24. With the forward motion of the headrest 10, intermittent tilt motion of the headrest is produced by way of a to-and-fro motion of the pawl against the toothed ratchet 24. Assuming that the vehicle occupant will try to move the headrest 10 backward again when the headrest 10 reaches a desired tilt position while driving the pawl 25 in a to-and-fro motion, the headrest can be held at the desired tilt position by way of the locking action of the ratchet-and-pawl mechanism. In FIG. 8, reference sign 31 denotes a return spring hanged between the right-hand side of the toothed ratchet 24 fixed onto the base 22 and the tab-like portion of the cam plate 29 for constantly biasing the upper moveable frame 16 in the backward direction. As explained above, the conventional moveable headrest 10 is so designed that its locking state is released by rotating the headrest in the foremost position F, and that a desired tilt position is adjustable by moving the headrest from the backmost position B to the desired position, and that the headrest is held at the desired position irrespective of any backward motion of the headrest by the locking action of the ratchet-and-pawl mechanism.

In the above-noted conventional headrest 10, when the ratchet base 22, the cam plate 29 and the pawl bracket 26 are assembled onto the end 15a of the lower frame shaft 15, there are several problems, as detailed later in accordance with schematic assembly drawings, namely FIGS. 7, 9 and 10.

Referring now to FIGS. 7, 9 and 10, and specifically to FIG. 9, the end 15a of the lower frame shaft 15 is formed into a small-diameter portion 32 so as to define a stepped portion. The stepped portion is formed with a pair of opposing cut-outs 33 having a substantially D-shape in cross-section, as appreciated from a cross-sectional area 36 illustrated by hatching. As seen in FIG. 10, the pawl bracket 26 is fixed onto the top end of the small-diameter portion 32 of the lower frame shaft 15 by welding. As seen in FIG. 9, the cut-out of the stepped portion provides a pair of opposing substantially T-shaped flat surfaces 33a. The ratchet base 22 and the cam plate 29 are rotatably assembled on the end 15a of the lower frame shaft 15 in such a manner as to be rotatably supported on the outer peripheral surface of the small-diameter portion 32 except the T-shaped flat surface 33a. A washer 35 is interleaved between the radially-extending shoulder 33b of the stepped portion and the base 22, so as to prevent the inner axial movement of the base 22 by way of abutment of the side wall surface of the washer 35 and the radially-extending shoulder 33b of the stepped portion. To prevent the rotational movement of the washer 35 relative to the shaft end 15a (the small-diameter portion 32 having a substantially barrel shape in cross-section), the washer 35 is formed with a pair of opposing substantially D-shaped portions 37 each fitted onto the substantially T-shaped flat surface 33a. After the shaft end 15a is inserted into the barrel-shaped central opening of the washer 35, the through-opening 22a of the base 22, the circular opening of the cam plate 29 and the circular bore 26a of the pawl bracket 26 in that order, the small-diameter portion 32 of the shaft end 15a is fixedly connected to the pawl bracket 26 by welding, as shown in FIG. 10. With the shaft end 15a inserted into the circular bore 26a of the pawl bracket 26, a pair of opposing substantially D-shaped apertures 38 are defined between the inner peripheral surface of the circular bore 26a and the above-noted T-shaped flat surface 33b, owing to the presence of the cut-outs 33. Reference sign 39 denotes a welded metal zone. In such a conventional connecting structure of the pawl bracket 26 onto the shaft end 15a of the lower headrest frame shaft 15, weld spatter which will necessarily take place when welding the pawl bracket 26 onto the shaft end 15a, often enters into the interior of the ratchet-and-pawl mechanism. The weld spatter, can prevent smooth operation of the ratchet. In addition, when the pad 14 of the headrest 10 is formed by foaming expandable synthetic resin, preferably foamed urethane, it is possible for the foam liquid enter into the interior of the ratchet-and-pawl mechanism through the aperture defined between the shaft end 15a and the barrel-shaped opening of the washer 35 and through the aperture defined between the shaft end 15a and the through-opening 22a of the base 22. As appreciated, the urethane foam, which is unintendedly formed in the ratchet-and-pawl mechanism, may prevent smooth operation of the ratchet-and-pawl mechanism. Furthermore, since the ratchet base 22 and the cam plate 29 are rotatably supported on a partial outer peripheral surface of the shaft end 15a owing to the cut-outs 33, such a conventional headrest may be insufficient with respect to a reliability, a mechanical strength, and a durability. Also, the conventional moveable headrest requires an additional part such as the washer 35, and thus a number of parts for the headrest tends to be increased. Moreover, machining required for the D-shaped cut-outs 33 is troublesome, thus increasing production costs of the headrest assembly.

SUMMARY OF THE INVENTION

Accordingly, it is an object of the invention to provide an improved moveable headrest that avoids the foregoing disadvantages of the prior art.

It is, an object of the present invention to provide an improved moveable headrest in which a ratchet base is rotatably supported on a shaft end of a lower headrest frame shaft with minimum parts, so that a pawl bracket incorporated in a ratchet-and-pawl mechanism is certainly fixed onto the shaft end of the lower frame shaft under a condition where the ratchet base and a cam plate are sandwiched between the shaft end and the pawl bracket.

It is another object of the invention to provide an improved moveable headrest of an advantageous assembling structure of a headrest frame to a ratchet-and-pawl mechanism that can prevent weld spatter resulting from welding a pawl bracket to the shaft end of a lower headrest frame shaft from entering into the interior of the ratchet-and-pawl mechanism and prevent foam liquid of expandable synthetic resin forming a pad of the headrest from entering into the ratchet-and-pawl mechanism, in order to enhance a reliability of operation of the ratchet.

In order to accomplish the aforementioned and other objects of the invention, a moveable headrest comprises a moveable upper headrest frame, a lower headrest frame shaft fixedly connected to a headrest stay, a pair of base members rotatably supported on respective shaft ends of the lower headrest frame shaft nearby their lower ends and fixedly connected to the moveable upper headrest frame at their upper ends, a ratchet-and-pawl mechanism attached to at least one of the base members for selectively engaging the upper headrest frame with the lower headrest frame shaft and for producing a forward-and-backward angular adjustment of the moveable headrest, a cover mounted on an outside of each of the base members, for hermetically covering the ratchet-and-pawl mechanism disposed in the at least one base member. The ratchet-and-pawl mechanism includes a toothed ratchet attached to the at least one base member and a pawl bracket having a pawl engageable with the toothed ratchet and fixedly connected to the shaft end associated with the at least one base member, each base member having a circular through-opening at its inside wall, each shaft end of the lower headrest frame shaft having an essentially annular stepped portion nearby its end surface, so that a first annular side wall of the annular stepped portion abuts a perimeter of the circular through-opening, and the pawl bracket fixedly connected to the shaft end associated with the at least one base member, while sandwiching the at least one base member between the annular stepped portion and the pawl bracket. The above-noted at least one base member is rotatably supported on the shaft end of the lower headrest frame shaft under such a condition that the first annular side wall of the annular stepped portion abuts the perimeter of the circular through opening. The pawl bracket has a circular bore, the shaft end has a small-diameter portion at a top thereof, and the pawl bracket is fixedly connected to the top by all-around welding under a condition in which the small-diameter portion is fitted into the circular bore while sandwiching the at least one base member between the annular stepped portion and the pawl bracket. The shaft end is formed with a medium-diameter portion between the annular stepped portion and the small-diameter portion, the medium diameter portion has a diameter essentially identical to a diameter of an intermediate shaft portion of the lower headrest frame shaft, and the at least one base member is sandwiched between the annular stepped portion and the pawl bracket so that the first annular side wall of the annular stepped portion is in sliding-contact with the perimeter of the circular through-opening and an outer peripheral surface of the medium-diameter portion is in sliding-contact with an inner peripheral surface of the circular through-opening. The medium-diameter portion and the small-diameter portion cooperate with each other to define a second annular side wall therebetween, and the pawl bracket is fixedly connected to the top end of the lower headrest frame shaft by all-around welding under a condition in which the second annular side wall abuts a perimeter of the circular bore of the pawl bracket and an outer periphery of the small-diameter portion is fitted into an inner periphery of the circular bore of the pawl bracket. It is preferable for the annular stepped portion to be formed integral with the lower headrest frame shaft by pressing such as cold forging or warm forging.

DESCRIPTION OF THE PREFERRED EMBODIMENTS

Figure 1:
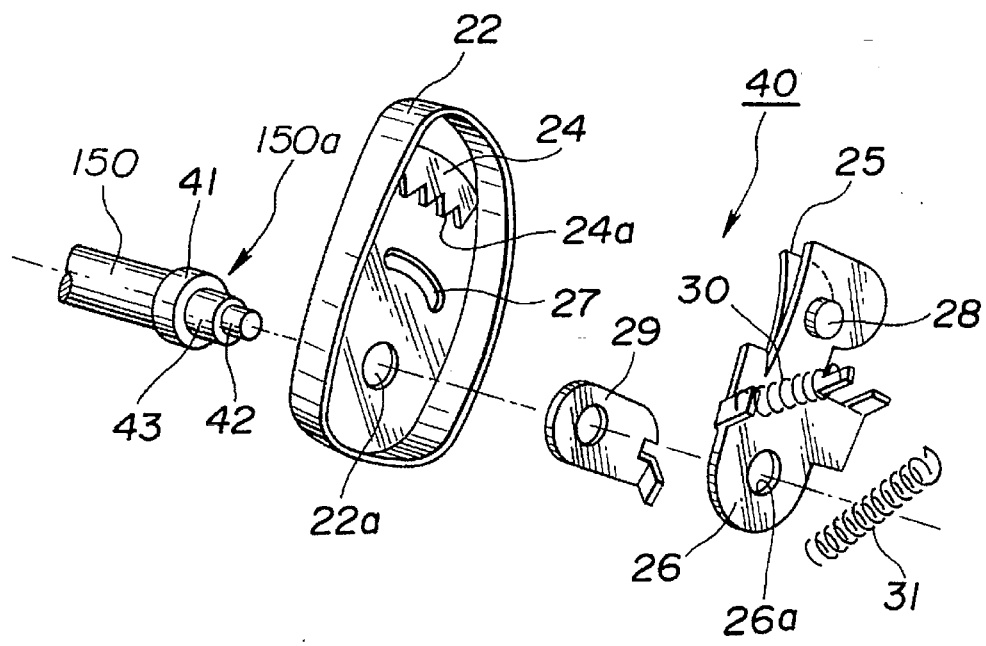
FIG. 1 is a schematic exploded perspective view showing one embodiment of a moveable headrest according to the present invention.
Figure 2:
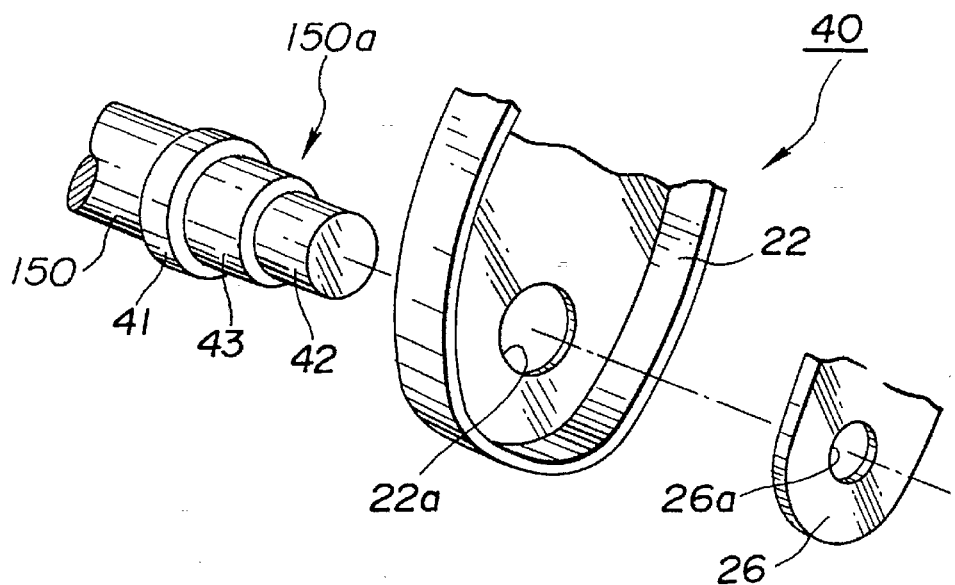
FIG. 2 is a perspective view illustrating an essential portion of the movable headrest shown in FIG. 1.
Figure 3:
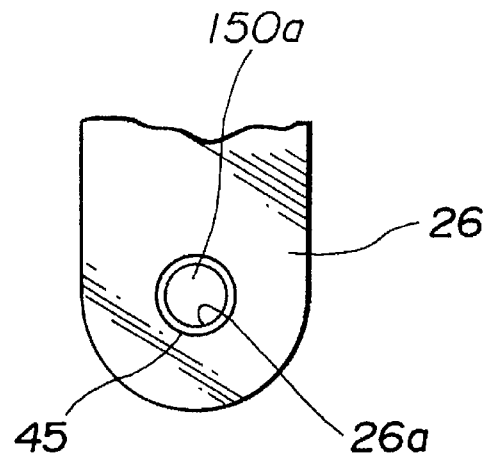
FIG. 3 is a side view showing a condition of weld connection between the lower frame shaft and the pawl bracket.
Figure 4:
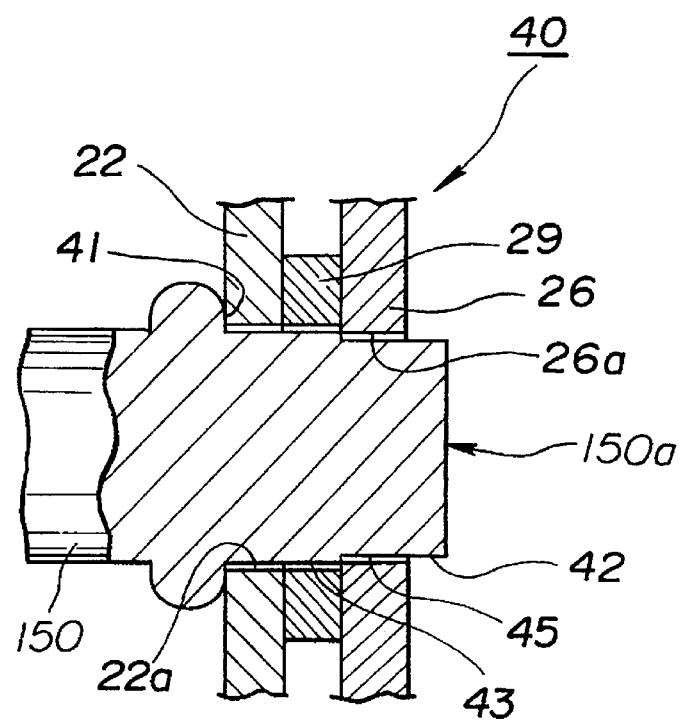
FIG. 4 is a cross-sectional view illustrating an assembly state of the ratchet base and the pawl bracket on the shaft end of the lower frame shaft.
Figure 5:
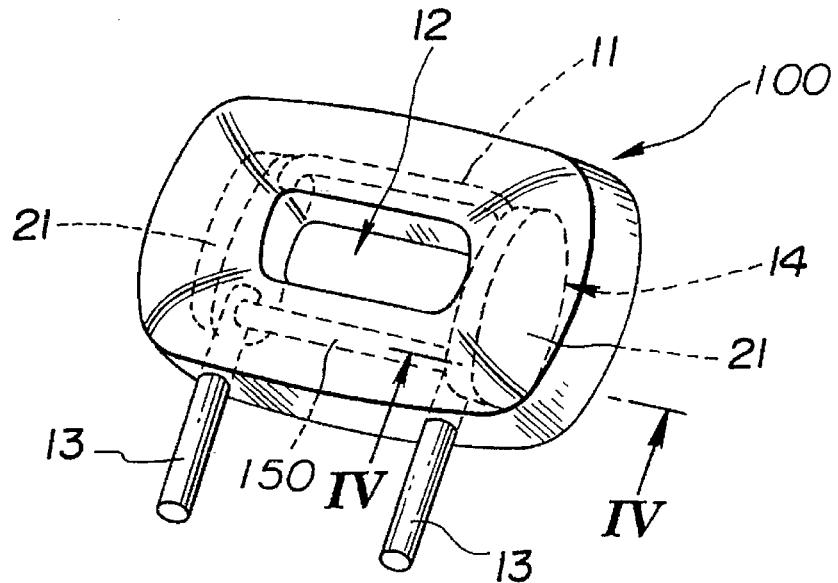
FIG. 5A is a schematic perspective view illustrating a moveable headrest assembly made according to the present invention.
FIG. 5B is a schematic perspective view illustrating a headrest frame structure of the moveable headrest of the invention.
Figure 5:
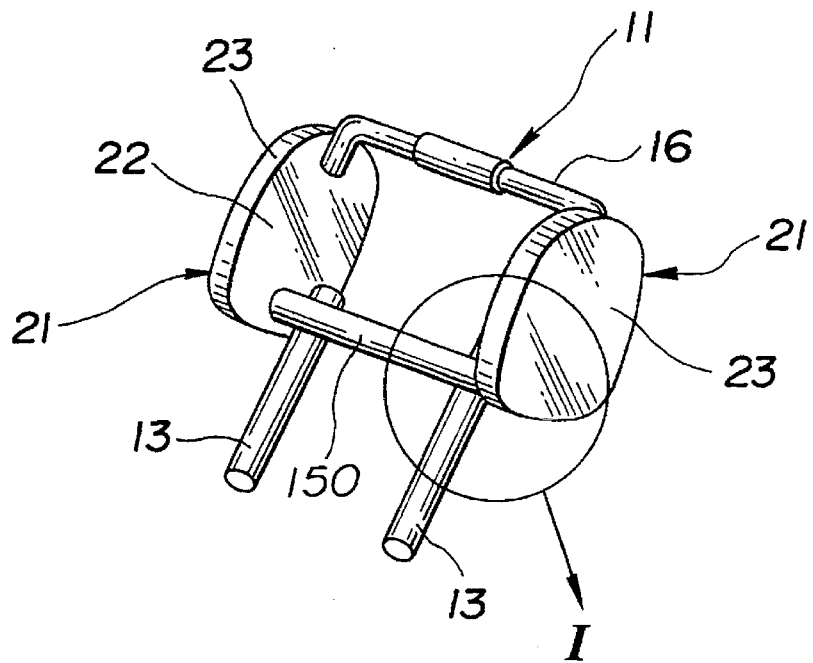
Figure 6:
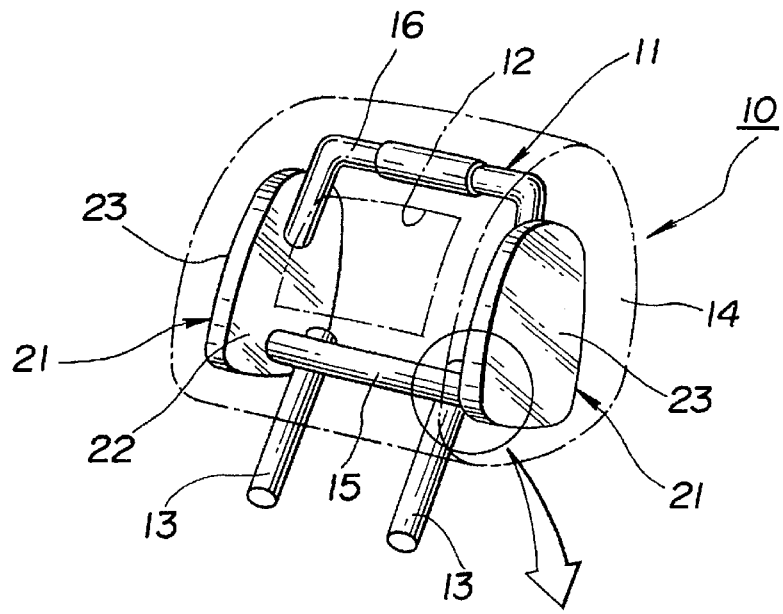
FIG. 6 is a schematic perspective view illustrating a prior art moveable headrest.
Figure 7:
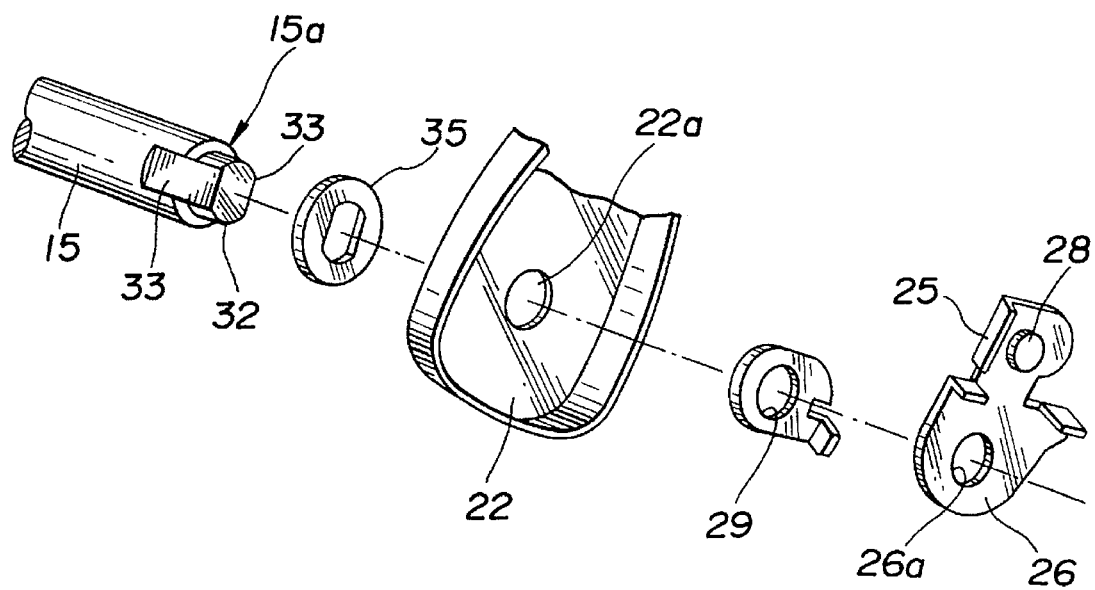
FIG. 7 is an exploded perspective view illustrating a part of a ratchet-and-pawl mechanism incorporated in the prior art moveable headrest.
Figure 8:
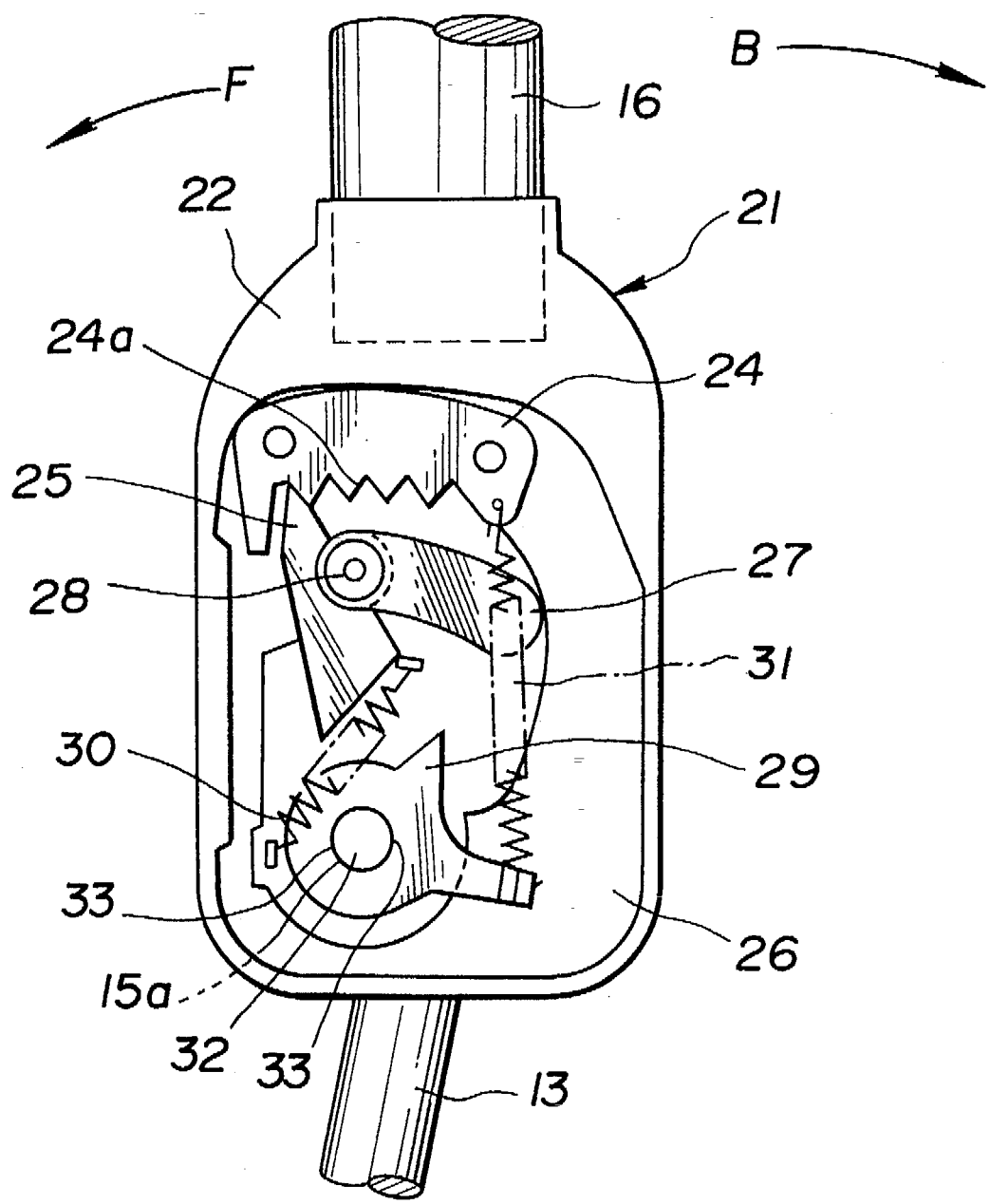
FIG. 8 is a side view illustrating an assembled ratchet-and-pawl mechanism of the prior art moveable headrest.
Figure 9:
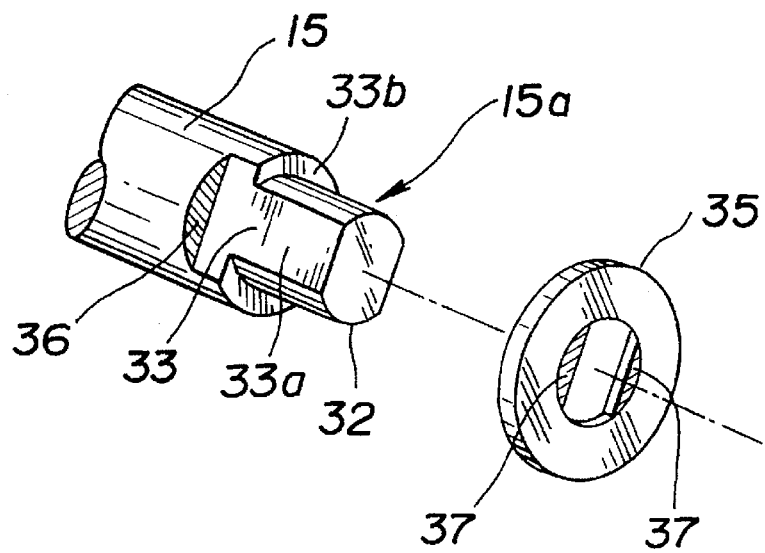
FIG. 9 is a schematic exploded perspective view illustrating the connection relationship between the shaft end of the lower headrest frame shaft and the washer.
Figure 10:
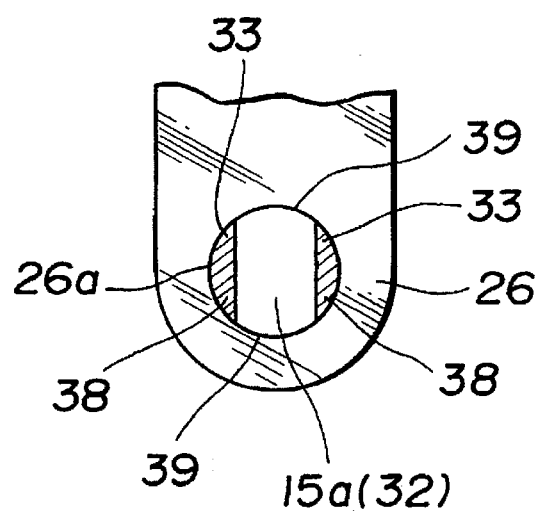
FIG. 10 is an explanatory view of the welded state of the pawl bracket onto the shaft end of the lower headrest frame shaft.

Referring now to FIGS. 1, 2, 3, 4, 5A and 5B, there is shown one embodiment of the moveable headrest of the present invention. The moveable headrest 100 of the embodiment is similar to the prior art moveable headrest 10 as previously discussed, except that the structure of the shaft end 150a of the lower headrest frame shaft 150 of the headrest 100 of the present invention is different from that of the prior art headrest 10, and except that the assembling structure between the shaft end 150a of the lower headrest frame shaft 150, the base member (the ratchet base 22), the cam plate 29 and the pawl bracket 26 is different in comparison with that of the prior art headrest 10. Therefore, the same reference numerals used in the prior art headrest of FIGS. 6–10 will be applied to the corresponding elements used in the embodiment of FIGS. 1 to 4, 5A and 5B, for the purpose of comparison between the prior art headrest and the improved headrest of the embodiment. As seen in FIGS. 5A and 5B, the headrest frame 11 of the headrest 100 of the embodiment is comprised of a horizontally-extending lower headrest frame shaft 150 fixedly connected to a pair of headrest stays 13 detachably engaged with the upper portion of the seat back, a substantially reversed U-shaped upper moveable or tiltable headrest frame 16 mechanically linked to both ends 150a of the lower frame shaft 150 through a ratchet-and-pawl mechanism 40, and a pair of ratchet bases 22 each rotatably supported by the lower frame shaft 150 and fixedly connected to the upper tiltable frame 16. The ratchet-and-pawl mechanism 40 is actually accommodated in the respective ratchet-and-pawl casing 21 consisting of the ratchet base 22 and the ratchet cover 23. The ratchet cover is attached to the opening end of the ratchet base 22 to hermetically cover the opening end. As shown in FIG. 1, the ratchet base 22 is formed with a substantially arc-shaped guide groove 27 provided to guide the pivot shaft 28, which shaft is tightly fitted to the pawl bracket 26 by caulking for the purpose of pivotally mounting the pawl 25 on the pawl bracket 26. In the shown embodiment, the guide groove 27 is formed by pressing such as embossing. As previously explained in the prior art disclosure, the ratchet-and-pawl mechanism 40 is provided to selectively engage the ratchet base 22 with the lower frame shaft 150 or disengage the base 22 from the lower frame shaft 150. As best seen in FIG. 1, the ratchet-and-pawl mechanism 40 is comprised of a toothed ratchet 24 fixedly connected to the base 22 and having teeth 24a, and a pawl bracket 26 having a pawl 25 engageable with the tooth 24a of the ratchet 24 and fixedly connected to the shaft end 150a of the lower frame shaft 150. As shown in FIGS. 1, 2 and 4, note that the respective shaft end 150a of the lower frame shaft 150 of the improved headrest 100 of the embodiment is formed in the manner of three steps, namely an essentially annular large-diameter stepped portion 41, a medium-diameter portion 43 and a small-diameter portion 42. The medium-diameter portion has an essentially same diameter as the diameter of the intermediate shaft portion formed between the large-diameter portions 41 of the ends both of the lower frame shaft 150. The diameter of the annular large-diameter stepped portion 41 is so designed to be larger than that of the medium shaft portion 43, while the diameter of the small-diameter portion 42 is so designed to be smaller than that of the medium shaft portion 43. When assembling both the ratchet base 22 and the cam plate 29 onto the lower frame shaft 150, the essentially annular side wall of the comparatively large-diameter stepped portion 41 abuts the inside wall or the left-hand side wall (viewing FIG. 1) of the ratchet base 22, and the inner peripheral surface of the circular through-opening 22a of the ratchet base 22 is rotatably supported on the cylindrical outer peripheral surface of the medium-diameter portion 43. Also, the cam plate 29 is rotatably assembled onto the outer periphery of the medium-diameter portion 43 under a condition wherein the left-hand side wall of the cam plate 29 abuts the right-hand side wall of the ratchet base 22. Thereafter, the pawl bracket 26 is fitted to the small-diameter portion 42 until the left-hand side wall of the pawl bracket 26 abuts an essentially annular side wall defined between the medium-diameter portion 43 and the small-diameter portion 42, while sandwiching both the ratchet base 22 and the cam plate 29 by the large-diameter stepped portion 41 and the pawl bracket 26. Under these conditions, as seen in FIGS. 3 and 4, the pawl bracket 26 is fixed onto the small-diameter portion 42 by all-around welding from the right-hand side (viewing FIG. 4), since the shaft end 150a of the improved headrest 100 does not require any cut-outs, as compared with the prior art moveable headrest. In FIGS. 3 and 4, reference sign 45 indicates the all-around welded metal zone. As appreciated from the cross-section shown in FIG. 4, by virtue of the essentially annular side wall defined between the medium-diameter portion 43 and the small-diameter portion 42 and also by virtue of the large-diameter stepped portion 41, the assembling structure among the shaft end 150a, the ratchet base 22, the cam plate 29 and the pawl bracket 26 can effectively prevent weld spatter from entering into the interior of the ratchet-and-pawl mechanism 40. The all-around welding insures a high mechanical strength with respect to the connection between the shaft end 150a and the pawl bracket 26. In the shown embodiment, the large-diameter stepped portion 41 is formed at the shaft end 150a of the lower frame shaft 150 by pressing such as cold forging or warm forging by means of an automatic pressing machine often called a header. After pressing for formation of the large-diameter stepped portion 41, the small-diameter portion 42 is formed by machining such as turning. Alternatively, the above-noted multi-stepped portion consisting of the large-diameter stepped portion 41, the medium-diameter portion 43 and the small-diameter portion 42 may be integrally formed by combined extrusion or forward extrusion by means of a so-called header.

With the above-noted arrangement, the ratchet base 22 can be directly abutted with the annular side wall of the large-diameter stepped portion 41 without any washer. Thus, the number of components of the moveable headrest 100 is reduced to the minimum, thereby enhancing an assembling efficiency of the headrest, and also reducing production costs of the headrest. Additionally, since the shaft end 150a of the lower frame shaft 150 does not have any unnecessary cut-outs and the ratchet base 22 and the cam plate 29 are rotatably supported on the cylindrical outer peripheral surface of the medium-diameter portion 43, which outer peripheral surface extends continuously in the peripheral direction of the lower frame shaft 150, the headrest of the embodiment can enhance the reliability of operation of the ratchet-and-pawl mechanism 40 and the performance of the mechanism 40 itself. Furthermore, the circular through-opening 22a of the ratchet base 22 and its perimeter, both serving as a sliding-contact surface, are fully and satisfactorily supported by the cylindrical outer surface of the medium-diameter portion 43 and the essentially annular side wall of the large-diameter stepped portion 41, thus enhancing the total mechanical strength and the durability of the ratchet-and-pawl mechanism 40. Also, since the slight annular clearance defined between the inner periphery of the circular through-opening 22a of the ratchet base 22 and the outer periphery of the medium-diameter portion 43 is hermetically covered by the annular side wall of the stepped portion 41 throughout the circumference of the through-opening 22a, the connection relationship between the shaft end 150a and the ratchet base 22 can effectively prevent foam liquid from entering into the ratchet-and-pawl mechanism during foaming expandable synthetic resin, preferably foamed urethane. This ensures a high reliability of operation of the ratchet-and-pawl mechanism 40 and a high performance of the mechanism 40.

Although the moveable headrest made according to he invention is exemplified in case of a doughnut shaped moveable headrest, often called see-through type moveable headrest having a central opening, it will be appreciated that the previously-explained connection structure of the lower headrest frame shaft and the ratchet base may be applied to any type of moveable headrests.

In the shown embodiment, although a pair of ratchet-and-pawl mechanisms 40 are provided in the right and left ratchet-and-pawl casings 21, respectively, the ratchet-and-pawl mechanism 40 may be provided in at least one of the ratchet-and-pawl casings 21. In order to more certainly hold the headrest body at its desired angular position, it is preferable that a pair of ratchet-and-pawl mechanisms 40 be provided in the respective ratchet-and-pawl casings 21.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A moveable headrest comprising:

a moveable upper headrest frame;

a lower headrest frame shaft fixedly connected to a headrest stay, said lower headrest frame shaft having a pair of shaft ends and an intermediate shaft portion spanning between said shaft ends;

a pair of base members rotatably supported on said shaft ends and fixedly connected to said moveable upper headrest frame;

a ratchet-and-pawl mechanism attached to at least one of said base members for selectively engaging said upper headrest frame with said lower headrest frame shaft and for allowing forward-and-backward angular adjustment of said moveable headrest; and a cover for hermetically covering said ratchet-and-pawl mechanism;

said ratchet-and-pawl mechanism including:
a toothed ratchet attached to the associated base member; and
a pawl bracket having a pawl engageable with said toothed ratchet and fixedly connected to said associated shaft end, wherein the base member associated with said ratchet-and-pawl mechanism has a circular through-opening, wherein said associated shaft end has an essentially annular stepped portion abutting a perimeter of said circular through-opening, a small-diameter portion, and a medium-diameter portion between said stepped portion and said small-diameter portion, and wherein said pawl bracket has a circular bore and is fixedly connected to said small-diameter portion by all-around welding, said medium-diameter portion having a diameter substantially identical to a diameter of said intermediate shaft portion adjacent said annular stepped portion, the associated base member being sandwiched between said annular stepped portion and said pawl bracket, with said stepped portion in sliding contact with the perimeter of said through-opening and an outer peripheral surface of said medium-diameter portion in sliding contact with the periphery of said through-opening.

2. A moveable headrest as set forth in claim 1, wherein said medium-diameter portion and said small-diameter portion define a second annular side wall therebetween, which abuts against the perimeter of said circular bore of said pawl bracket, and wherein a periphery of said small-diameter portion is fitted into an inner periphery of said circular bore of said pawl bracket.

3. A moveable headrest as set forth in claim 2, wherein said annular stepped portion is formed integral with said lower headrest frame shaft by cold forging.

4. A movable headrest as set forth in claim 2, wherein said annular stepped portion is formed integral with said lower headrest frame shaft by warm forging.

* * * * *